Jan. 28, 1958    J. J. LANDER ET AL    2,821,565
BATTERY GRID AND PLATE
Filed Oct. 19, 1955
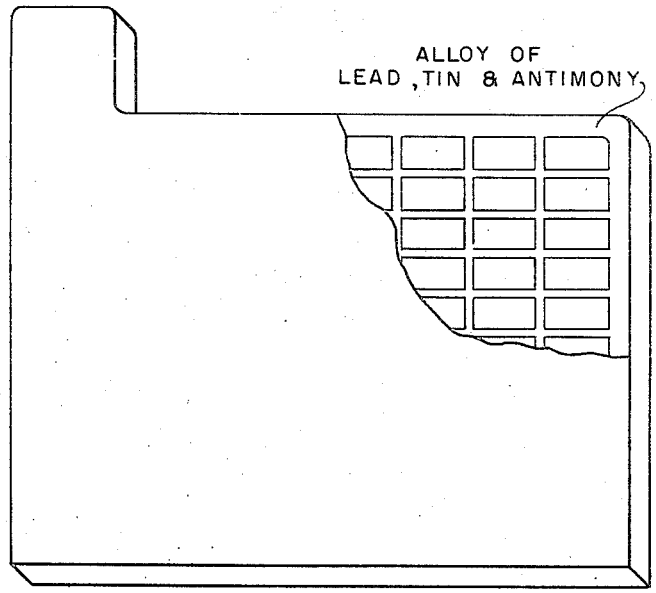
INVENTORS
JOHN J. LANDER
JEANNE B. BURBANK
ALBERT C. SIMON
BY
ATTORNEYS

United States Patent Office 2,821,565
Patented Jan. 28, 1958

2,821,565

BATTERY GRID AND PLATE

John J. Lander, Hyattsville, Md., Jeanne B. Burbank, Washington, D. C., and Albert C. Simon, Arlington, Va., assignors to the United States of America as represented by the Secretary of the Navy Application October 19, 1955, Serial No. 541,549

8 Claims. (Cl. 136—65)

(Granted under Title 35, U. S. Code (1952), sec. 266)

The invention described herein may be manufactured and used by or for the Government of the United States of America for governmental purposes without the payment of any royalties thereon or therefor.

This invention relates to storage batteries of the acid-lead type, more particularly to an improved grid and positive plates therefor.

The construction and arrangement of parts of the acid-lead type storage battery are well known. The plates of the battery are of the pasted type and the metal of the grid is usually a lead-antimony alloy, for which the standard alloy contains about 0.25% by weight tin, about 8 to 9% by weight antimony and the balance lead.

Corrosion and grid growth are known factors contributing to the shortening of the life of the acid-lead type storage battery. Corrosion produces lead peroxide at the expense of the lead of the grid, more especially that of the positive plates, and is the product of an electrochemical reaction between the water of the electrolyte, aqueous sulfuric acid, and the lead of the grid. The reaction is progressive, continually building up lead peroxide and eroding the grid. In some instances corrosion may be severe enough to soften the structure of the positive plates or even cause their disintegration. Grid growth reduces the capacity of the battery and is associated with corrosion, being the greater, the more extensive the corrosion. The lead peroxide formed by the corrosion reaction is of greater volume than the lead from which it is derived and by reason of the greater bulk exerts pressure on the grid which develops a strain in the grid in a lateral direction. That portion of the corrosion lead peroxide which is in contact with the metal of the grid is closely bound thereto and this tight bond causes the grid to yield in the direction of the strain therein. This action of the corrosion lead peroxide is cumulative in its effect with the result that growth of the grid in the direction of its horizontal and vertical dimensions take place. Growth of the grid in the positive plates causes separation or loosening of contact between the grid and the original lead peroxide (active material) in one or more places with resultant building-up of the internal resistance of the battery and consequent lowering of its capacity.

The general purpose of the present invention is to improve the construction and increase the operating life of the acid-lead storage battery with a principal object being the provision of an improved grid and positive plates therefor which have greater resistance to corrosion and growth than has heretofore been obtained.

We have found that positive plates of the pasted type which are superior to those made with a grid of the aforesaid standard lead-antimony alloy can be obtained by employing as the grid for the positive plates one which is formed of an alloy of lead, tin and antimony in the proportions hereinafter set forth.

The lead base alloy for the grid of the present invention is a solid solution of from about 4 to 5% by weight tin, from about 7 to 10% by weight antimony and the balance lead. The antimony content of the alloy is preferably between about 8 and 9% by weight. A preferred alloy for the grid is one having about 4:5% by weight tin, about 8 to 9% by weight antimony and the balance lead, with an optimum composition for the alloy being about 4.5% tin, about 8.5% antimony and the balance lead. The lead of the alloy may be of the grade usually employed for making storage battery grids, which lead contains traces of other elements, or it may be one of higher purity, and the term lead as used herein and in the claims has reference to such.

A lead alloy of the above composition functions to force growth of the corrosion products from the grids in planes which have a large component perpendicular to the lateral dimensions of the grid and positive plate. In this way the stress imposed on the grid and plate by the accumulating corrosion products is exerted largely in a direction outwardly of the same and away from the lateral dimensions thereof with the result that growth of the grid and plate is materially reduced.

The presence in the alloy of tin in the amounts set forth above is necessary both to obtain the high tensile strength and the low corrosion rate of the grid, both of which properties are factors governing growth of the grid and plate in the battery.

The invention herein is to be practiced to the greatest advantage in thin grids, i. e., those on the order of .08 inch thick, since these have as a general rule a tendency to develop growth at earlier stages than do grids of greater thickness. As grid thickness increases, the corrosion rate itself becomes increasingly a much more important factor than growth in determining the useful life of positive plates.

The new grid of the invention is superior to those made of the usual lead-antimony alloys in a lower corrosion and growth rate. The topography of the corrosion of the new grid is such that grid growth is also decreased in comparison with grids of lead-tin and lead-tin-calcium alloys which have very good corrosion resistance but poor growth characteristics.

The new grid and pasted positive plates may be made in accordance with known practice or in any other way found suitable, the essential being the construction of the grid from an alloy as defined above. The alloy for the grid can be made in conventional manner by inocculation of the melt of the lead with the calculated addition of tin and antimony.

A grid and pasted positive plate of the invention are illustrated in the single figure of the accompanying drawing, the active material (lead peroxide) of the plate being partly broken away to show the grid structure.

The effectiveness of the new grid to resist corrosion and growth, which will vary somewhat with the amount of tin in the alloy, is demonstrated by the fact that under conditions which exist in actual operation of the acid-lead storage battery, a grid of the invention cast of an alloy containing 4.5% by weight tin, 8.5% by weight antimony and the balance lead showed a substantially smaller degree of corrosion and growth than a grid cast of the standard lead-antimony alloy containing 0.25% by weight tin and 8% by weight antimony and the balance lead.

Actual storage battery operating conditions were simulated for testing of the new alloy grid against the grid of standard alloy by means of a system involving a cycling lead-acid storage battery connected in parallel with the test cell containing the sample grid of the invention and the grid of standard alloy. The cycling battery was a single cell battery of standard manufacture. The test cell contained a pasted positive plate and a pasted negative plate of conventional manufacture connected in parallel with the cycling single cell battery. Between the positive and negative plates were located the sample grid and the grid of standard alloy both of which were shorted to the positive plate. Two runs, each of twelve months' duration, were made in separate test cells, the one using aqueous sulfuric acid of 1.2 specific gravity and the other aqueous sulfuric acid of 1.29 specific gravity as the electrolyte. The amount of corrosion of the grids under test was determined by stripping the solid corrosion product from the tested grids by means of a solution composed of 10 grams of hydrazine, 20 grams of mannitol and 100 grams of sodium hydroxide dissolved in 870 cc. of water, weighing the cleaned grids, and subtracting the weight thus obtained from the original weight of the grids before testing of the same. The difference in the two weights is the loss in metal content of the grids due to the corrosion. The growth in the grid is determined by comparing the change in the vertical and horizontal dimensions of the tested grid with those of the grid in its original condition before testing.

Since the invention may be variously embodied without departing from the spirit and scope thereof, it is intended that the specific embodiment of the invention appearing in the above description shall be taken as illustrative rather than in limitation except as may be required by the following claims.

What is claimed is:

1. A storage battery grid formed of a lead base alloy consisting essentially of from 4 to 5% by weight tin, from 7 to 10% by weight antimony and the balance lead.

2. A storage battery grid formed of a lead base alloy consisting essentially of from 4 to 5% by weight tin, from 8 to 9% by weight antimony and the balance lead.

3. A storage battery grid formed of a lead base alloy consisting essentially of about 4.5% by weight tin, from 8 to 9% by weight antimony and the balance lead.

4. A storage battery grid formed of a lead base alloy consisting essentially of about 4.5% by weight tin, about 8.5% by weight antimony and the balance lead.

5. A pasted storage battery positive plate in which the grid is formed of a lead base alloy consisting essentially of from 4 to 5% by weight tin, from 7 to 10% by weight antimony and the balance lead.

6. A pasted storage battery positive plate in which the grid is formed of a lead base alloy consisting essentially of from 4 to 5% by weight tin, from 8 to 9% by weight antimony and the balance lead.

7. A pasted storage battery positive plate in which the grid is formed of a lead base alloy consisting essentially of about 4.5% by weight tin, from 8 to 9% by weight antimony and the balance lead.

8. A pasted storage battery positive plate in which the grid is formed of a lead base alloy consisting essentially of about 4.5% by weight tin, about 8.5% by weight antimony and the balance lead.

References Cited in the file of this patent

UNITED STATES PATENTS

| | | |
|---|---|---|
| 408,182 | Knowles | July 30, 1889 |
| 842,801 | Morrison | Jan. 29, 1907 |
| 1,807,788 | Kemp | June 2, 1931 |
| 2,221,677 | Grimditch | Nov. 12, 1940 |
| 2,252,104 | Walde | Aug. 12, 1941 |

FOREIGN PATENTS

| | | |
|---|---|---|
| 576,164 | Germany | May 8, 1933 |

OTHER REFERENCES

"Self Discharge in Lead-Acid St. Batteries," by A. C. Zachlin, Tr. of the El. Chem. Society, vol. 92, 1947, pp. 259–279.